United States Patent
Wu

(10) Patent No.: US 7,904,636 B2
(45) Date of Patent: Mar. 8, 2011

(54) SYSTEM AND METHOD FOR ACCESSING INTERLEAVED DATA IN A MEMORY DEVICE

(75) Inventor: Chien-Hung Wu, Hsinchu (TW)

(73) Assignee: STEC, Inc., Santa Ana, CA (US)

( * ) Notice: Subject to any disclaimer, the term of this patent is extended or adjusted under 35 U.S.C. 154(b) by 147 days.

(21) Appl. No.: 11/358,673

(22) Filed: Feb. 21, 2006

(65) Prior Publication Data

US 2006/0143426 A1    Jun. 29, 2006

Related U.S. Application Data

(63) Continuation-in-part of application No. 10/063,278, filed on Apr. 8, 2002, now Pat. No. 7,035,993.

(30) Foreign Application Priority Data

Jan. 11, 2002   (TW) .............................. 91100279 A

(51) Int. Cl.
  *G06F 12/10*   (2006.01)
(52) U.S. Cl. ................... 711/103; 711/203; 711/E12.016
(58) Field of Classification Search .................. 711/103, 711/157, 203
  See application file for complete search history.

(56) References Cited

U.S. PATENT DOCUMENTS

| | | |
|---|---|---|
| 5,297,148 A | 3/1994 | Harari et al. |
| 5,404,485 A | 4/1995 | Ban |
| 5,479,638 A | 12/1995 | Assar et al. |
| 5,602,987 A | 2/1997 | Harari et al. |
| 5,611,067 A | 3/1997 | Okamoto et al. |
| 5,799,168 A | 8/1998 | Ban |
| 5,818,781 A | 10/1998 | Estakhri et al. |
| 5,907,856 A | 5/1999 | Estakhri et al. |
| 5,930,815 A | 7/1999 | Estakhri et al. |
| 5,937,425 A | 8/1999 | Ban |
| 5,946,714 A | 8/1999 | Miyauchi |
| 5,956,743 A * | 9/1999 | Bruce et al. ................... 711/103 |
| 5,963,983 A | 10/1999 | Sakakura et al. |
| 5,991,517 A | 11/1999 | Harari et al. |
| 6,034,897 A | 3/2000 | Estakhri et al. |
| 6,040,997 A | 3/2000 | Estakhri |
| 6,134,151 A | 10/2000 | Estakhri et al. |
| 6,141,249 A | 10/2000 | Estakhri et al. |
| 6,145,051 A * | 11/2000 | Estakhri et al. ............... 711/103 |
| 6,148,354 A | 11/2000 | Ban et al. |
| 6,149,316 A | 11/2000 | Harari et al. |
| 6,172,906 B1 | 1/2001 | Estakhri et al. |
| 6,202,138 B1 | 3/2001 | Estakhri et al. |
| 6,262,918 B1 | 7/2001 | Estakhri et al. |
| 6,282,624 B1 | 8/2001 | Kimura et al. |
| 6,374,337 B1 | 4/2002 | Estakhri |

(Continued)

*Primary Examiner* — Shane M Thomas
(74) *Attorney, Agent, or Firm* — McDermott Will & Emery LLP

(57) ABSTRACT

A memory and storage device includes a data management system for transferring data units referenced by logical addresses. The data management system maps the logical addresses to sequential virtual addresses according to the order the data units are received. The data management system also maps the sequential virtual addresses to sequential physical addresses in a memory block of a memory device. Additionally, the data management system can modify a data unit in the memory block by copying any other valid data units in the memory block to another memory block and writing the modified data unit into this other memory block. The data management system writes the valid data units and the modified data unit into sequential physical addresses of this other memory block.

18 Claims, 13 Drawing Sheets

U.S. PATENT DOCUMENTS

| | | |
|---|---|---|
| 6,397,314 B1 | 5/2002 | Estakhri |
| 6,414,876 B1 | 7/2002 | Harari et al. |
| 6,477,616 B1 | 11/2002 | Takahashi |
| 6,523,132 B1 | 2/2003 | Harari et al. |
| 6,678,785 B2 | 1/2004 | Lasser |
| 6,684,345 B2 | 1/2004 | Harari et al. |
| 6,732,221 B2 | 5/2004 | Ban |
| 6,732,222 B1 | 5/2004 | Garritsen et al. |
| 6,839,826 B2 | 1/2005 | Cernea |
| 2002/0004878 A1 | 1/2002 | Norman |
| 2003/0120841 A1* | 6/2003 | Chang et al. ............... 710/52 |
| 2005/0144358 A1* | 6/2005 | Conley et al. ............. 711/103 |
| 2005/0144361 A1* | 6/2005 | Gonzalez et al. ......... 711/103 |

* cited by examiner

SYSTEM AND METHOD FOR ACCESSING INTERLEAVED DATA IN A MEMORY DEVICE

CROSS-REFERENCE TO RELATED APPLICATIONS

This application is a continuation-in-part of U.S. patent application Ser. No. 10/063,278 filed Apr. 8, 2002, which is incorporated herein by reference, and which claims priority benefit of Taiwan application serial no. 91100279, filed Jan. 11, 2002.

BACKGROUND

1. Field of Invention

The present invention generally relates to computer memory and storage devices, and more particularly, to accessing and transferring data in non-volatile memory and storage devices.

2. Description of Related Art

Non-volatile solid state memory and storage devices are becoming increasingly popular. In many applications, non-volatile solid state memory is being used in place of, or to compliment, a disk drive. One type of such non-volatile solid state memory is a flash memory. A flash memory uses transistors, which include both a control gate and a floating gate, as memory cells. Data is read from a memory cell of the flash memory by applying a voltage to the control gate of the transistor of the memory cell. Data is stored into the memory cell by applying an elevated voltage to the control gate, which injects electrons into the floating gate. Data is erased from the memory cell by applying an elevated voltage to the control gate, which causes the electrons to tunnel out of the floating gate. In many flash memories, the memory cells must be erased in blocks before data can be stored into an individual memory cell in the block.

In many flash memories, the smallest basic unit of data which can be written is a block. Modifying data of a given memory block is often performed by selecting an unused memory block, performing a block erasure operation on the selected memory block, writing the modified data into the selected memory block, and identifying the given memory block as a used memory block. However, often it is desired to write a smaller amount of data than a block. As can be seen, if a smaller amount of data is to be written, an entire block must be written. This additional writing adversely affects the performance of the flash memory and thus, in the long term, reduces the operating life of the flash memory.

In light of the above, there exists a need for improving data access in a flash memory, and improving the operational efficiency of a write operation in a flash memory.

SUMMARY

In various embodiments, a data management system receives data units referenced by logical addresses and maps the logical sector numbers to sequential virtual addresses according to the order the data units are received. The data management system also maps the sequential virtual addresses to sequential physical addresses in a memory block of a memory device. Additionally, the data management system can modify a data unit in the memory block by copying any other valid data units in the memory block to another memory block and writing the modified data unit into this other memory block. The data management system writes the valid data units and the modified data unit into sequential physical addresses of this other memory block.

In a method of accessing data in a memory device including memory blocks, in accordance with one embodiment, data units and corresponding logical addresses are received. The logical addresses are mapped to sequential virtual addresses according to the order in which the data units are received. The sequential virtual addresses are mapped to corresponding sequential physical addresses of a memory block.

In a method of accessing data in a memory device including memory blocks, logical sectors of data and corresponding logical sector numbers are received. The logical sector numbers are mapped to sequential virtual sector numbers according to the order in which the logical sectors of data are received. The sequential virtual sector numbers are mapped to corresponding sequential physical sector numbers of a memory block.

A system for accessing data in a memory device including memory blocks, in accordance with one embodiment, includes a first interface, a second interface, and a management module coupled to the first interface and the second interface. The first interface is configured to receive data units and corresponding logical addresses. The management module is configured to map the logical addresses to sequential virtual addresses according to the order in which the data units are received by the first interface. The management module is further configured to map the sequential virtual addresses to corresponding sequential physical addresses in a memory block. The second interface is configured to write the data units into the memory block at the sequential physical addresses.

A system for accessing data in a memory device including memory blocks, in accordance with one embodiment, includes an input buffer and a controller coupled to the input buffer. The input buffer is configured to receive data units and corresponding logical addresses. The controller is configured to map the logical addresses to sequential virtual addresses according to the order in which the data units are received in the input buffer. The controller is further configured to map the sequential virtual addresses to corresponding sequential physical addresses in a memory block.

In a method for accessing data in a memory device including memory blocks, in accordance with one embodiment, first data units and corresponding first logical addresses are received. Also, second data units and corresponding second logical addresses are received. The first logical addresses are mapped to first sequential virtual addresses. The second logical addresses are mapped to second sequential virtual addresses. A memory block including sequential physical memory addresses is selected. The first data units are written into a data buffer based on the first sequential virtual addresses, and the second data units are written into the data duffer based on the second sequential virtual addresses. The data units in the data buffer are written into the memory block at the sequential physical addresses.

A system for accessing data in a memory device including memory blocks, in accordance with one embodiment, includes an input buffer, a data buffer, and a controller coupled to the input buffer and the data buffer. The data buffer configured to stored data units. The input buffer is configured to receive first data units and corresponding first logical addresses. The input buffer is further configured to receive second data units and corresponding second logical addresses. The controller is configured to map the first logical addresses to first sequential virtual addresses, map the second logical addresses to second sequential virtual addresses, write the first data units into the data buffer based on the first virtual addresses, write the second data units into the data buffer based on the second virtual addresses, select a memory block including sequential physical memory addresses, and write the data units in the data buffer into the memory block at the sequential physical addresses.

In a method of accessing data in a memory device including memory blocks, in accordance with one embodiment, a first physical address of a first data unit in a first memory block is identified. A second memory block having sequential physical addresses is selected. At least one data unit having a physical address preceding the first physical address in the first data unit is copied into the second data unit at a second physical address of the sequential physical addresses. The second physical address is a first available physical address in the sequential physical addresses. A modified first data unit is written into the second memory block at a third physical address in the sequential physical addresses. The third physical address is a next available physical address in the sequential physical addresses after the second physical address.

BRIEF DESCRIPTION OF DRAWINGS

The accompanying drawings are included to provide a further understanding of the invention, and are incorporated in and constitute a part of this specification. The drawings illustrate embodiments of the invention, and together with the description, serve to explain the principles of the invention. In the drawings.

DETAILED DESCRIPTION

In various embodiments, data units referenced by logical addresses are received, and the logical addresses are mapped to sequential virtual addresses in the order in which the data is received. The sequential virtual addresses are mapped to corresponding sequential physical memory addresses of a memory block. The data units are then written into the memory block at the sequential physical addresses. In this way, the memory block is filled with data units and need not be erased to modify a data unit in the memory block until the memory block is full.

Figure 1:
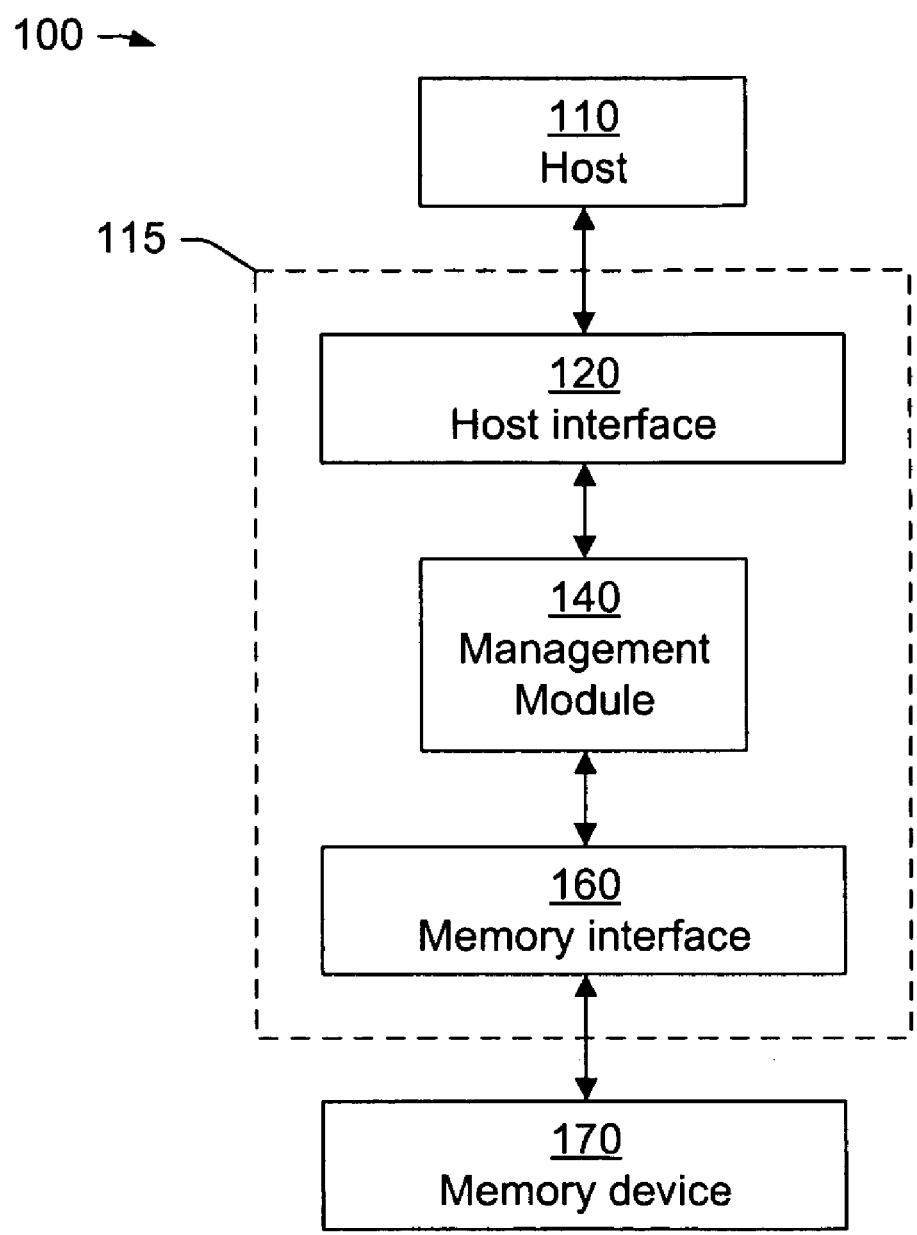
FIG. 1 is a block diagram of a data management system, in accordance with an embodiment of the present invention.

FIG. 1 illustrates an electronic device 100 including a data management system 115, in accordance with an embodiment of the present invention. The electronic device 100 further includes a host 110 and a memory device 170, each of which is coupled to the data management system 115. The memory device 170 may be a non-volatile memory, such as a flash memory, that functions as a data storage device for the host 110. The data management system 115 includes a host interface 120, a memory interface 160, and a management module 140 coupled to the host interface 120 and the memory interface 160. In one embodiment, the data management system 115 may be a peripheral device, the management module 140 may be a unit management device (UMD), and the memory interface 160 may be a flash memory interface.

The electronic device 100 may be a personal computer, a portable computer, a personal digital assistant (PDA), a digital camera, or any electronic equipment utilizing a non-volatile memory. Further, the host 110 may be configured to communicate with a peripheral storage device based on an Advanced Technology Attachment (ATA) protocol. Such an ATA protocol defines a command protocol or a transmission standard for communication between the host 110 and a peripheral storage device. A vendor of a peripheral storage device may also define a specific command set to exercise specific functions of the peripheral storage device.

The host 110 may be configured to communicate with a peripheral storage device, such as a mass storage device, by utilizing a cylinder, head and sector (CHS) mode of the ATA protocol. For example, the host 100 may communicate with a traditional floppy disk drive by utilizing the CHS mode. Alternatively, the host 110 may communication with a peripheral storage device by utilizing a logical block addressing (LBA) mode, which maps the peripheral storage device into logical sectors. For example, the host 100 may communicate with a non-volatile memory by utilizing the LBA mode. In the embodiment of FIG. 1, the host 110 utilizes the LBA mode of the ATA protocol to communicate with the memory device 170 via the data management system 115.

In LBA mode, cylinder, head and sector coordinates of the peripheral storage device are converted to logical sector (LS) number. Such a conversion is represented in the following equation: LS=((Cylinder+1)×(number of heads)+Head+1)×(number of sectors per cylinder)+Sector−1, wherein Cylinder is a cylinder coordinate, Head is a head coordinate, and Sector is a sector coordinate. Thus, each combination of Cylinder, Head, and Sector of the peripheral storage device corresponds to a unique LS number.

Figure 2:
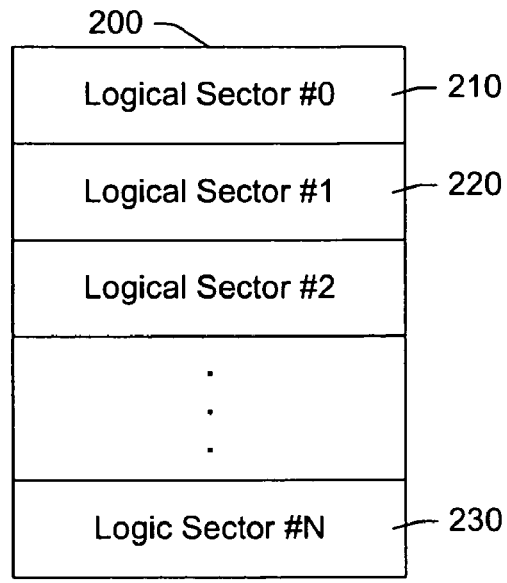
FIG. 2 is a block diagram of a logical portion of the data management system, in accordance with an embodiment of the present invention.

FIG. 2 illustrates a logical portion 200 of the management module 140 (FIG. 1). The logical portion 200 partitions the memory device 170 into logical sectors (e.g., Logical Sectors #0 through #N) according to the ATA protocol. For example, the memory device 170 may be organized into 512 byte sectors, each of which is mapped to a logical sector, such as the logical sector 210, 220, or 230, in the logical portion 200.

Referring again to FIG. 1, the host 110 performs an access operation in the memory device 170 via the host interface 120, the management module 140, and the memory interface 160. The management module 140 performs a data access method based on the access operation and the memory interface 160 provides an ATA command to the memory device 170.

In one embodiment, characteristics of the memory device 170 include: (1) a memory block is the smallest unit which can be erased; (2) a memory page is the basic read/write unit; (3) a write operation causes a memory bit value to change from 1 to 0, or to remain 0, but does not cause a memory bit value to change from 0 to 1; and (4) a page is a basic unit of the ATA protocol (which uses 512-byte sectors). In the data access method, if the management module 140 performs a direct, one-to-one mapping of logical addresses to physical addresses utilizing the LBA mode of the ATA protocol, a memory block of the memory device 170 is erased when a memory page is modified in the memory device 170. In this case, the operational efficiency of the memory device 170 is minimal because memory blocks will be erased more often. The management module 140 has one or more characteristics of the memory device 170.

In one embodiment, the management module 140 performs a data access method that improves the operational efficiency of the memory device 170 and also increase the reliability of accessing data in the memory device 170. The data access method includes both a sector management portion and a memory block management portion, as is described more fully herein. Advantages of the data access method include: (1) reducing the number of memory block erasures; (2) utilizing the flash write busy time (e.g., 200 nanoseconds) and the erase busy time (e.g., 3 milliseconds) of the memory device 170; and (3) reducing the burst write time of the host 110. Further details of the data access method are described hereinafter with reference to the accompanying drawings.

Figure 3:
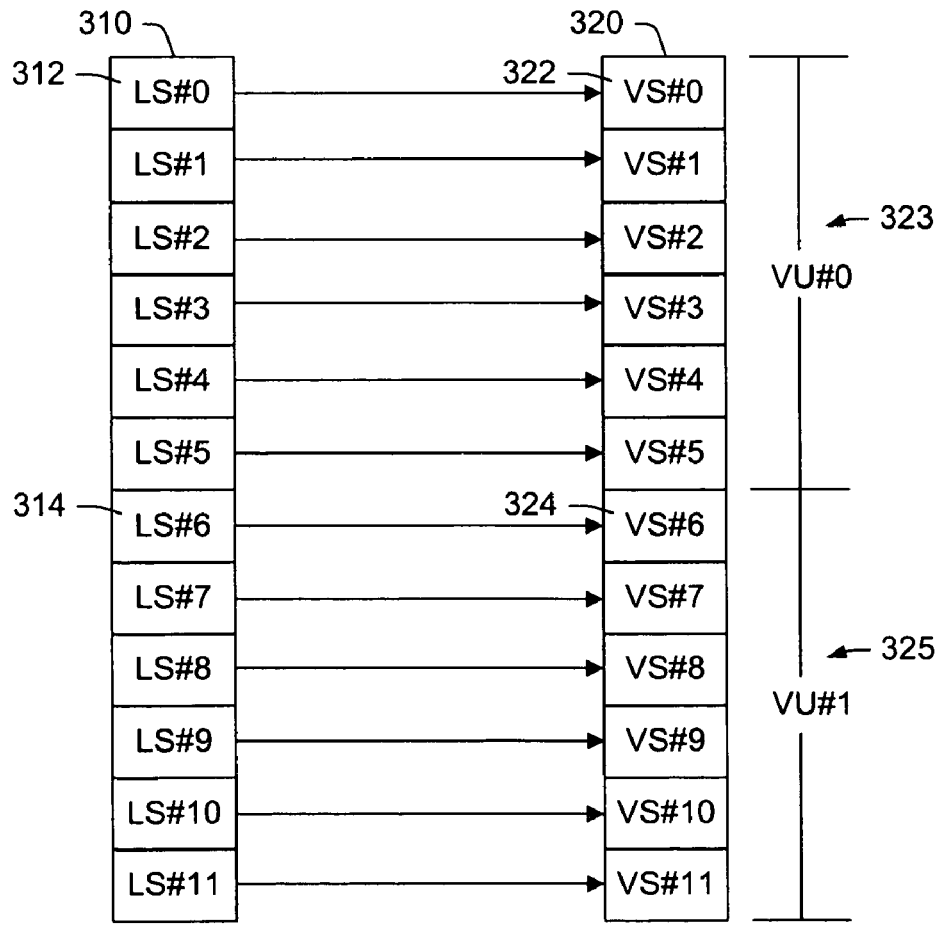
FIG. 3 is a schematic diagram of a logical portion mapped to a virtual portion, in accordance with an embodiment of the present invention.

FIG. 3 illustrates a logical portion 310 mapped to a virtual portion 320, in accordance with one embodiment. The management module 140 (FIG. 1) maps the logical portion 310 to the virtual portion 320 when the host 110 (FIG. 1) utilizes the LBA mode of the ATA protocol to accesses data in the memory device 170 (FIG. 1). As may be envisioned from FIG. 3, the host 110 accesses the data sequentially according to logical sector (LS) numbers (e.g., LS#0 through LS#11), which identify logical sectors (e.g., logical sectors 312 or 314) in a logical portion 310. Although twelve logical sectors are shown in FIG. 3, the method may include a different number of logical sectors, in accordance with the spirit of the present invention. Thus, the embodiment of FIG. 3 is an exemplary embodiment and does not limit the scope or application of the present invention.

The management module 140 (FIG. 1) allows the host 110 (FIG. 1) to access logical sectors of data (i.e., data units) in the memory device 170 (FIG. 1) according to the sequence of logical sector numbers (e.g., LS#0 through LS#11) identifying the logical sectors (e.g., logical sectors 312 and 314). In this process, the management module 140 performs the data access which may cause the memory device 170 to reduce the number of memory block erasures and memory block writes during operation. Moreover, the reduction in memory block erasures and memory block writes tend to increase the lifetime of the memory device 170.

The management module 140 (FIG. 1) maps the logical sectors (e.g., logical sectors 312 and 314) into virtual sectors (e.g., virtual sectors 322 and 324) contained in the virtual portion 320. The virtual sectors in the virtual portion 320 are identified by virtual sectors numbers (e.g., VS#0 to VS#11). Each logical sector (e.g., logical sector 312 or 314) in the logical portion 310 corresponds to a virtual sector (e.g., logical sector 322 or 324) in the virtual portion 320 via a one-to-one mapping. For example, the logical sector 312 having the logical sector number zero (LS#0) corresponds to the virtual sector 324 having the virtual sector number zero (VS#0), and the logical sector 314 having the logical sector number six (LS#6) corresponds to the virtual sector 324 having the virtual sector number six (VS#6). Although twelve virtual sectors are shown in FIG. 3, the method may include a different number of virtual sectors, in accordance with the spirit of the present invention.

The virtual portion 320 includes a virtual unit (VU) 323 and a virtual unit 325. The virtual unit 323 includes half (i.e., six) of the virtual sectors, and the virtual unit 325 includes the other half (i.e., six) of the virtual sectors. As shown in FIG. 3, the virtual unit 323 contains the virtual sector 322, and the virtual unit 325 contains the virtual sector 324. Although the embodiment of FIG. 3 shows two virtual units 323 and 325, other embodiments may include a different number of virtual units 323 or 325.

The virtual units 323 and 325 of FIG. 3 are identified by respective virtual unit numbers zero (VU#0) and virtual unit number one (VU#1). The virtual unit number of the virtual unit (e.g., 323 or 325) is the integer portion of the virtual sector number of any virtual sector (e.g., 322 or 324) in the virtual unit divided by the number of virtual sectors in the virtual unit. For example, the virtual unit number of the virtual unit 323 (i.e., zero) is the integer portion of the virtual sector number of the virtual sector 322 (i.e., 0) divided by the number of virtual sectors in the virtual unit 323 (i.e., 6), and the virtual unit number of the virtual unit 325 (i.e., 1) is the integer portion of the virtual sector number of the virtual sector 324 (i.e., 6) divided by the number of virtual sectors in the virtual unit 325 (i.e., 6).

Figure 4:
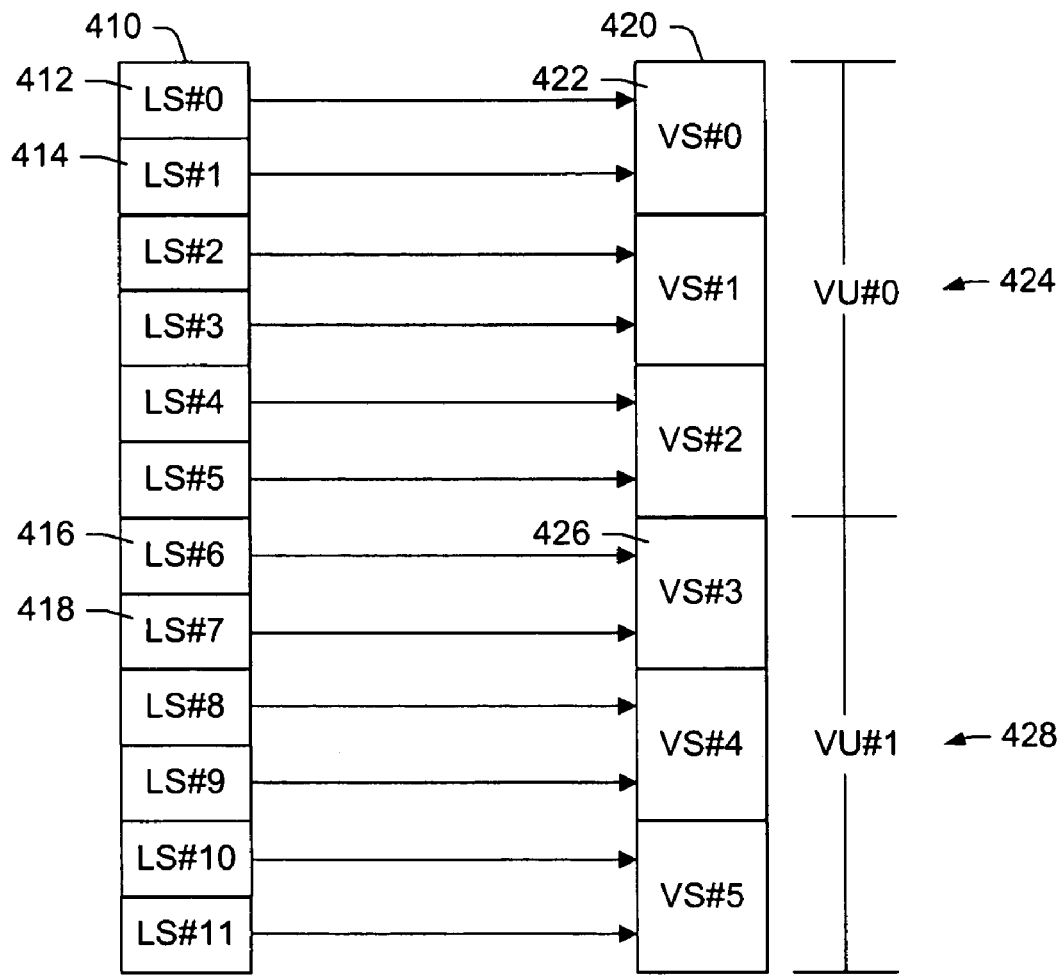
FIG. 4 is a schematic diagram of a logical portion mapped to a virtual portion, in accordance with an alternative embodiment of the present invention.

FIG. 4 illustrates a logical portion 410 mapped to a virtual portion 420, in accordance with another embodiment. The logical portion 410 includes logical sectors, such as logical sectors 412, 414, 416, and 418. The virtual portion 420 includes virtual sectors, such as virtual sectors 422 and 426. The host 110 (FIG. 1) sequentially access data according to the sequence of the logical sector numbers.

In contrast to the embodiment of FIG. 3, in this embodiment the logical sectors (e.g., logical sectors 412, 414, 416, and 418) do not correspond to the virtual sectors (e.g., virtual sectors 422 and 426) in a one-to-one mapping. Instead, two logical sectors correspond to one virtual sector. For example, the logical sector 412 identified by the logical sector number zero (LS#0) and the logical sector 414 identified by the logical sector number one (LS#1) both correspond to the virtual sector 422 identified by the virtual sector number zero (VS#0). Also, the logical sector 416 identified by the logical sector number six (LS#6) and the logical sector 418 identified by the logical sector number seven (LS#7) both correspond to the virtual sector 426 identified by the virtual sector number three (VS#3). As may be envisioned from FIG. 4, each virtual sector number of a virtual sector is the integer portion of the logical sector number of the corresponding logical sector divided by two.

The virtual portion 420 includes a virtual unit (VU) 424 and a virtual unit 428. The virtual unit 424 includes half (i.e., three) of the virtual sectors, and the virtual unit 428 includes the other half (i.e., three) of the virtual sectors. As shown in FIG. 4, the virtual unit 424 contains the virtual sector 422, and the virtual unit 428 contains the virtual sector 426. Although the embodiment of FIG. 4 shows two virtual units 424 and 428, other embodiments may include a different number of virtual units.

The virtual unit number of the virtual unit (e.g., virtual units 424 or 428) is the integer portion of the virtual sector number of any virtual sector (e.g., virtual sectors 412, 414, 416, or 418) in the virtual unit divided by the number of virtual sectors in the virtual unit. In this embodiment, each of the virtual units 424 or 428 has three virtual sectors. For example, the virtual unit number of the virtual unit 424 (i.e., 0) is the integer portion of the virtual sector number of the virtual sector 422 (i.e., 0) divided by the number of virtual sectors in the virtual unit 424 (i.e., 3). Also, the virtual unit number of the virtual unit 428 (i.e., 1) is the integer portion of the virtual sector number of the virtual sector 426 (i.e., 3) divided by the number of virtual sectors in the virtual unit 428 (i.e., 3).

Figure 5:
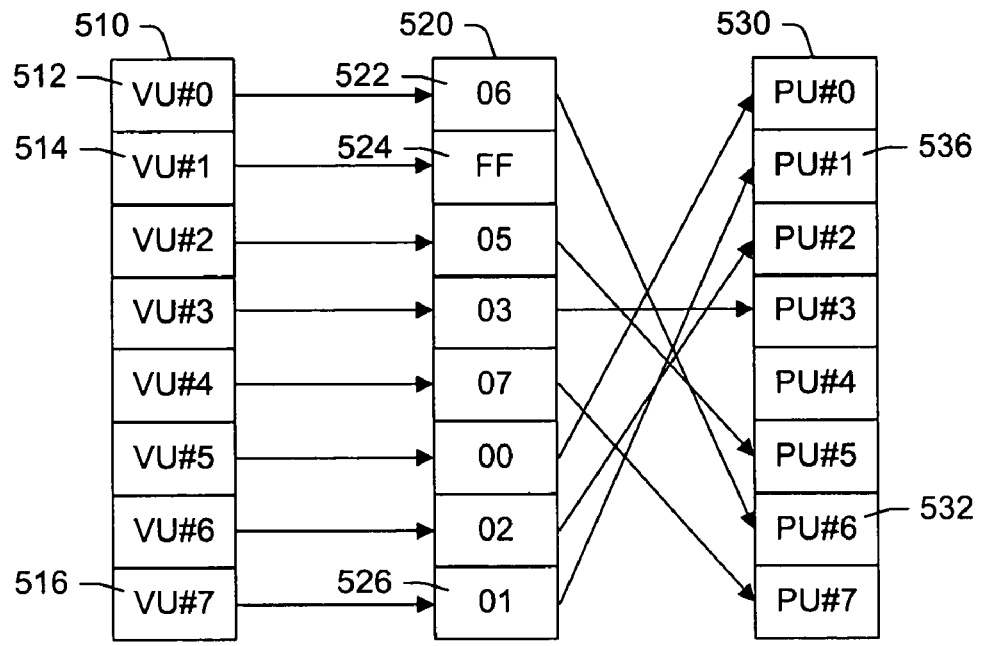
FIG. 5 is a schematic diagram of virtual-to-physical table, in accordance with an embodiment of the present invention.

FIG. 5 illustrates a virtual-to-physical (VP) table 520, in accordance with one embodiment. The VP table 520 maps a virtual portion 510 to a physical portion 530. The physical portion 530 represents physical addresses of the memory device 170 (FIG. 1). Generally, the memory device 170 (FIG. 1) includes physical units (e.g., physical units 536 and 532) corresponding to physical addresses. The VP table 520 maps virtual units to the physical units of the memory device 170. In one embodiment, the management 140 includes the VP table 520, although in other embodiments, the VP table 520 may be elsewhere, such as in the memory device 170. In various embodiments, the VP table 520 is a data structure such as, for example, a data structure defined in a high-level computing language.

The VP table 520 includes table entries, such as table entries 522, 524 and 526, for mapping the virtual units to the physical units. For example, as shown in FIG. 5, the table entry 522 corresponding to the virtual unit 512 can store a value of six to map the virtual unit 512 identified by the virtual unit number zero (VU#0) to the physical unit 532 identified by the physical unit number six (PU#6). As is also shown in FIG. 5, the table entry 526 corresponding to the virtual unit 516 identified by the virtual unit number seven (VU#7) can store a value of one to map the virtual unit 516 to the physical unit 536 identified by the physical unit number one (PU#1). The table entry 524 corresponding to the virtual unit 514 identified by the virtual unit number one (VU#1) stores a value of FF to indicate that the virtual unit 514 is not mapped (i.e., not allocated) to a physical unit. In other words, a data unit is not stored in the memory device 170 (FIG. 1) for the virtual unit 514. Thus, if a value in a table entry of the VP table 520 is equal to a physical unit number of a physical unit, the VP table 520 maps the virtual unit corresponding to the table entry to the physical unit.

Figure 6:
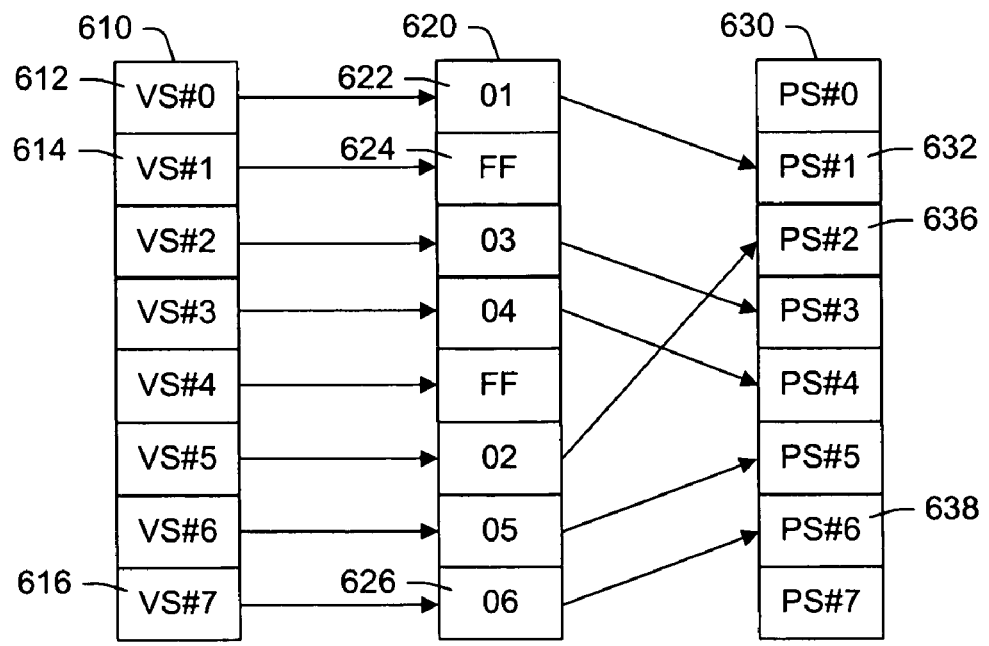
FIG. 6 is a schematic diagram of another virtual-to-physical table, in accordance with an embodiment of the present invention.

FIG. 6 illustrates a virtual-to-physical (VP) table 620 (i.e., a screen sector table), in accordance with one embodiment. The VP table 620 maps (i.e., converts) virtual sectors of a virtual unit 610 to physical sectors of a physical unit 630. The virtual unit 610 includes virtual sectors, such as virtual sectors 612, 614 and 416. The physical unit 630 includes physical sectors, such as physical sectors 632, 636, and 638. The management module 140 (FIG. 4) maps virtual sectors (e.g., virtual sectors 612, 614, and 616) to physical sectors (e.g., physical sectors 632, 636, and 638) via the virtual-to-physical (VP) table 620. The VP table 620 may be referred to as a "a screen sector table" because it maps data units on a sector level, in contrast to the VP table 520 which maps data units on a unit level. In various embodiments, the VP table 620 is a data structure such as, for example, a data structure defined in a high-level computing language.

The VP table 620 includes table entries, such as table entries 622, 624 and 626, for mapping the virtual sectors to the physical sectors. For example, as shown in FIG. 6, the table entry 622 corresponding to the virtual sector 612 can store a value of one to map the virtual sector 612 identified by the virtual sector number zero (VS#0) to the physical sector 632 identified by the physical sector number one (PS#1). As is also shown in FIG. 6, the table entry 626 corresponding to the virtual sector 616 identified by the virtual sector number seven (VS#7) can store a value of six to map the virtual sector 616 to the physical sector 638 identified by the physical sector number six (PS#6). The table entry 624 corresponding to the virtual sector 614 identified by the virtual sector number one (VS#1) stores a value of FF to indicate that the virtual sector 614 is not mapped (i.e., not allocated) to a physical sector. In other words, a data unit is not stored in the memory device 170 (FIG. 1) for the virtual sector 614. Thus, if a value in a table entry of the VP table 620 is equal to a physical sector number of a physical sector, the VP table 620 has mapped the virtual sector corresponding to the table entry to the physical sector.

The memory device 170 (FIG. 1) includes a memory unit or an array of memory units. The memory size of the memory device 170 may be selected according to design requirements of the electronic device 100 (FIG. 1) or other criteria. Each memory unit includes a number of memory blocks, the number of which may depend on a product or a vendor of the memory device 170. In general, the number of memory pages in a memory block varies depending upon the size and number of memory blocks in the memory device 170. For example, the flash memory model TC58V64 available from TOSHIBA has a memory size of sixty-four (64) Megabits (Mbits) and includes one-thousand-twenty-four (1024) memory blocks, thus each memory block includes sixteen (16) pages. As another example, the flash memory model TC5818 available from TOSHIBA has a memory size of one-hundred-twenty-eight (128) Mbits and includes one-thousand-twenty-four (1024) memory blocks, thus each memory block includes thirty-two (32) pages.

In general, a flash memory may have a busy status in which no operation can be performed to the flash memory. The busy status may last for a relatively long period (also referred to as "busy time") in comparison to the time for performing a read operation in the flash memory. For example, the time for performing a read operation may be 25 nanoseconds and the busy time may be 3 milliseconds. Thus, the memory blocks may be interleaved among memory units according to an interleave value to increase the operational efficiency of the flash memory. For example, an interleave value of one indicates that each memory block of a physical unit is in the same memory unit of the flash memory. As another example, an interleave value of two indicates that the memory blocks of a physical unit are interleaved among two memory units of the flash memory. In this way, a read operation may be performed in one of the memory units during the busy time in the other memory unit, thus increasing the operational efficiency of the flash memory.

Figure 7:
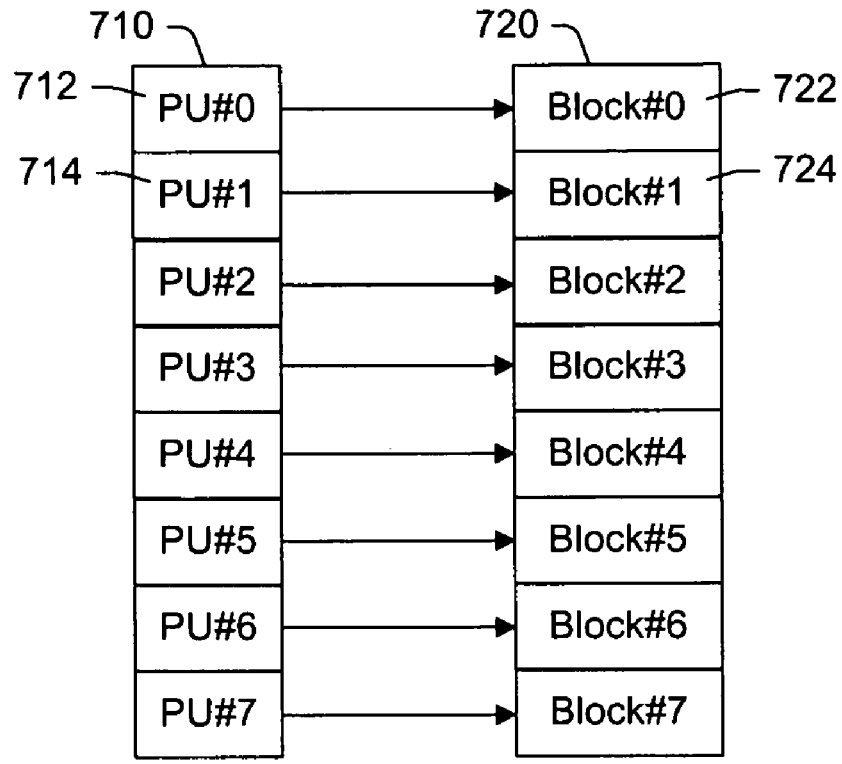
FIG. 7 is a block diagram of physical units mapped to memory blocks, in accordance with an embodiment of the present invention.

FIG. 7 illustrates the physical units mapped to memory blocks in the memory device 170 (FIG. 1) when the interleave value is one. Each physical unit (e.g., physical unit 712 or 714) in a physical portion 710 corresponds to one block (e.g., memory block 722 or 724) of a memory unit 720 in the memory device 170 (FIG. 1).

In FIG. 7, for example, the physical unit 712 identified by the physical unit number zero (PU#0) in the physical portion 710 corresponds to the memory block 722 identified by the memory block number zero (Block#0) in the memory unit 720 of the memory device 170 (FIG. 1). Also, the physical unit 714 identified by the physical unit number one (PU#1) in the physical portion 710 corresponds to the memory block 724 identified by the memory block number one (Block#1) in the memory unit 720 of the memory device 170.

Figure 8:
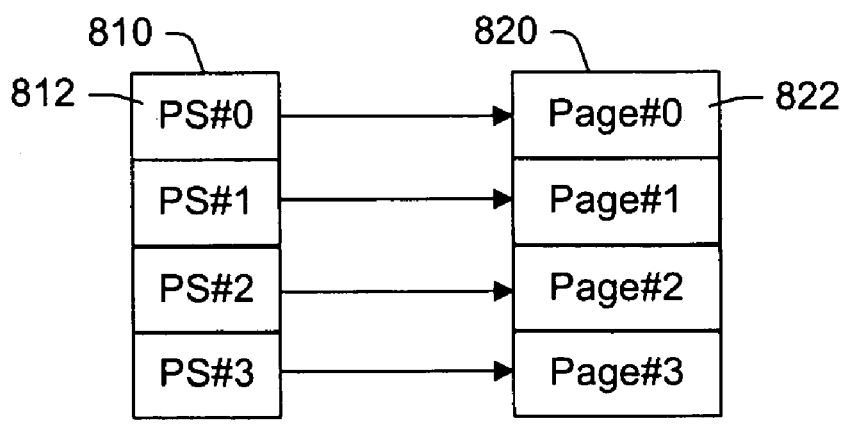
FIG. 8 is a block diagram of physical sectors mapped to memory pages, in accordance with an embodiment of the present invention.

FIG. 8 illustrates a physical unit 810, in which each physical sector (e.g., physical sector 812) of the physical unit 810 corresponds to a memory page (e.g., memory page 822) in a memory block 820 of the memory device 170 (FIG. 1). For example, the physical sector 812 identified by the physical sector number zero (PS#0) corresponds to the memory page 822 identified by the memory page number zero (Page#0) in the memory block 820 of the memory device 170.

Figure 9:
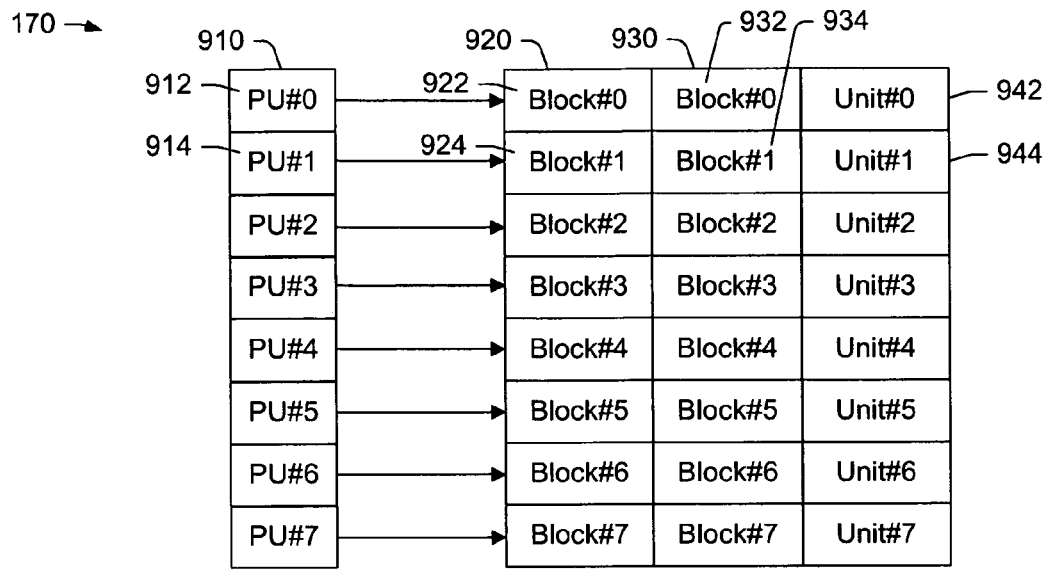
FIG. 9 is a schematic diagram of physical units mapped to memory blocks, in accordance with an embodiment of the present invention.
Figure 10:
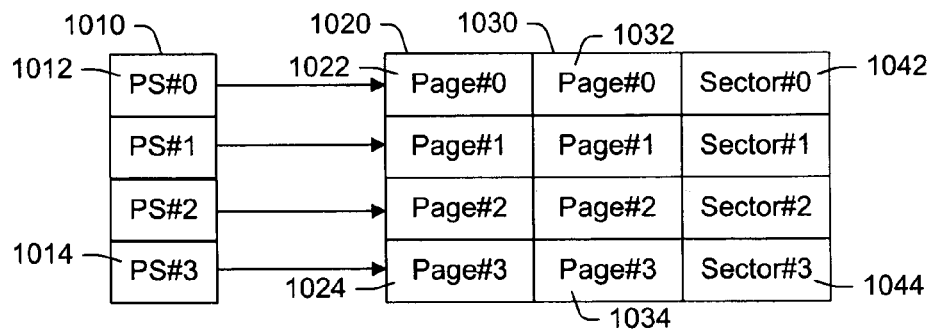
FIG. 10 is a schematic diagram of physical sectors mapped to memory pages, in accordance with an embodiment of the present invention.
Figure 11:
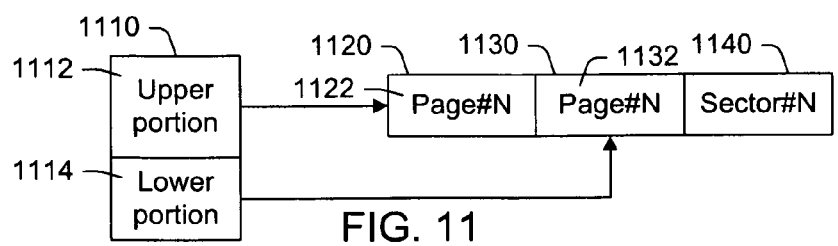
FIG. 11 is a schematic diagram of portions of physical sectors mapped to memory pages, in accordance with an embodiment of the present invention.

FIGS. 9, 10 and 11 illustrate the data mapping in the memory device 170 (FIG. 1) when the interleave value is two. As shown in FIG. 9, each physical unit in a physical portion 910 corresponds to both a block (i.e., a memory block) in a memory unit 920 and a block in the memory unit 930. As shown in FIG. 10, each physical sector in a physical unit 1010 corresponds to both a memory page in a memory unit 1020 and a memory page in a memory unit 1030. As shown in FIG. 11, a physical sector 1110 includes an upper portion 1112 corresponding to a memory page 1122 of a memory sector 1140 and a lower portion 1114 corresponding to a memory page 1132 in the memory sector 1140. The memory page 1122 is in a memory unit 1120 and the memory page 1132 is in a memory unit 1130.

In FIG. 9, for example, the physical unit 912 having the physical unit number zero (PU#0) in the physical portion 910 corresponds to both the memory block 922 having the memory block number zero (Block#0) in the memory unit 920 and to the memory block 932 having the memory block number zero (Block#0) in the memory unit 930. Both the memory block 922 and the memory block 932 are contained in an interleave unit 942 having an interleave unit number zero (Unit#0) in the memory device 170 (FIG. 1). The physical unit 914 having the physical unit number one (PU#1) in the physical portion 910 corresponds to both the memory block 924 having the memory block number one (Block#1) in the memory unit 920 and to the memory block 934 having the memory block number one (Block#1) in the memory unit 930. Further, both the memory block 932 and the memory block 934 are contained in an interleave unit 944 having an interleave unit number one (Unit#1) in the memory device 170.

In FIG. 10, for example, the physical sector 1012 having the physical sector number zero (PS#0) in the physical unit 1010 corresponds to both the memory page 1022 having the memory block number zero (Page#0) in the memory unit 1020 and to the memory page 1032 having the memory page number zero (Page#0) in the memory unit 1030. Both the memory page 1022 and the memory page 1032 are contained in a memory sector 1042. The physical sector 1014 having the physical sector number three (PS#3) in the physical unit 1010 corresponds to both the memory page 1024 having the memory page number three (Page#3) in the memory unit 1020 and to the memory page 1034 having the memory page number three (Page#3) in the memory unit 1030. Both the memory page 1024 and the memory page 1034 are contained in a memory sector 1044.

In FIG. 11, for example, the upper portion 1112 of the physical sector 1110 corresponds to the memory page 1122 having the memory page number N (Page#N) in the memory unit 1120. The lower portion 1114 of the physical sector 1110 corresponds to the memory page 1132 having the memory page number N (Page#N) in the memory unit 1130. Both the memory page 1122 and the memory page 1132 are in a memory sector 1140.

Figure 12:
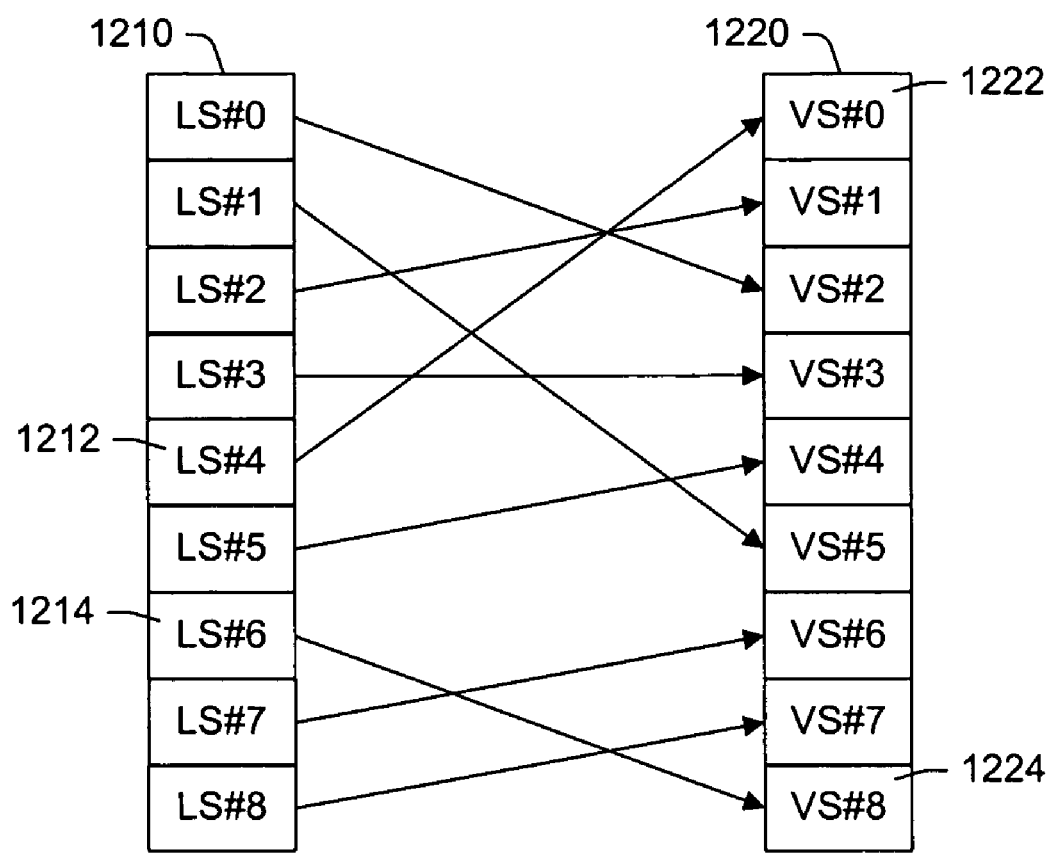
FIG. 12 is a schematic diagram of a logical portion mapped to a virtual portion, in accordance with an embodiment of the present invention.

FIG. 12 illustrates a logical unit 1210 mapped to a virtual unit 1220, in accordance with an embodiment of the present invention. The logical unit 1210 includes logical sectors, such as logical sectors 1212 and 1214, and the virtual unit 1220 includes virtual sectors, such as virtual sectors 1222 and 1224. Although nine logical sectors are shown in FIG. 12, the logical unit 1210 can have more or fewer logical sectors. The management module 140 (FIG. 1) receives data (i.e., data units) organized into logical sectors and maps the logical sectors (e.g., logical sectors 1212 and 1214) to the virtual sectors (e.g., virtual sectors 1222 and 1224) in the order the data units are received. As shown in the exemplary embodiment of FIG. 12, the management module 140 receives the data units according to a sequence of logical sector numbers LS#4, LS#2, LS#0, LS#3, LS#5, LS#1, LS#7, LS#8, and LS#6 corresponding to the logical sectors of the data units. In turn, the management module 140 maps the logical sectors to respective virtual sectors having corresponding virtual sector numbers VS#0, VS#1, VS#2, VS#3, VS#4, VS#5, VS#6, VS#7, and VS#8.

Figure 13:
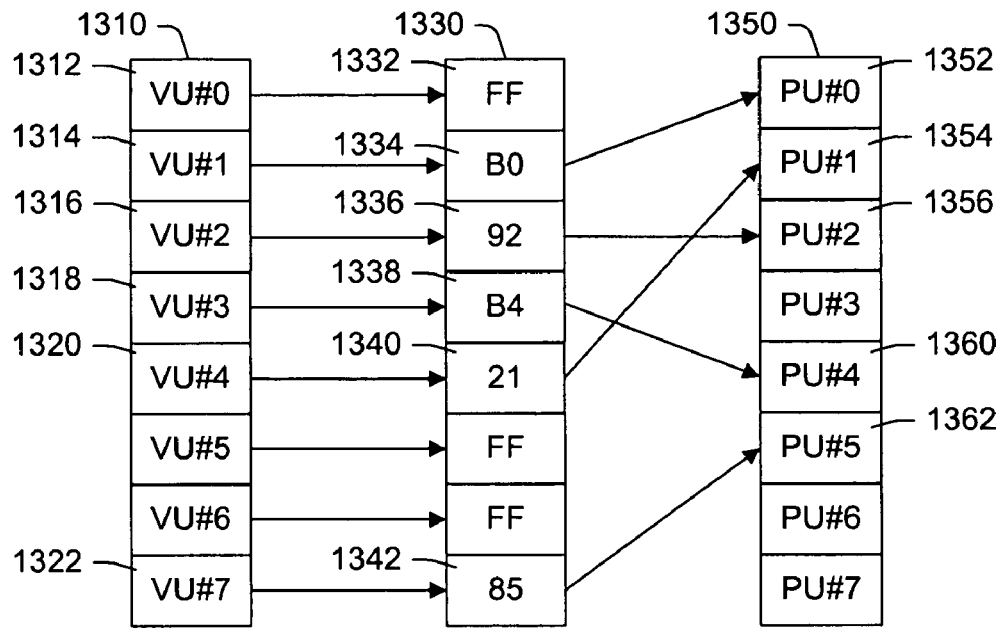
FIG. 13 is a schematic diagram of a virtual-to-physical table, in accordance with an embodiment of the present invention.

FIG. 13 illustrates a virtual-to-physical (VP) table 1330, in accordance with an embodiment of the present invention. The (VP) table 1330 maps a virtual portion 1310 to a physical portion 1350. The VP table 1330 includes table entries, such as table entries 1332, 1334, 1336, 1338, 1340, and 1342. Each table entry in the VP table 1330 can map a virtual unit, such as a virtual unit 1312, 1314, 1316, 1318, 1320, or 1322, in the virtual portion 1310 to a physical unit, such as a physical unit 1352, 1354, 1356, or 1360, in the physical portion 1350. Although eight table entries are shown in FIG. 13, the VP table 1330 can have more or fewer table entries in other embodiments. In various embodiments, the VP table 1330 is a data structure such as, for example, a data structure defined in a high-level computing language.

Figure 14:
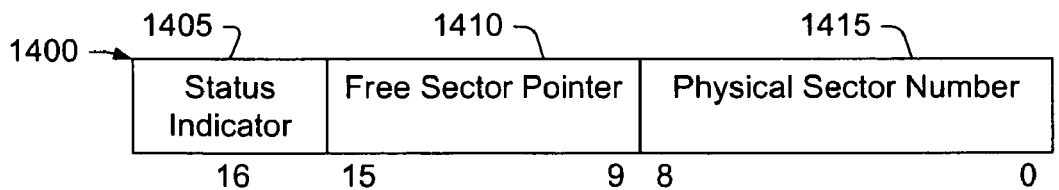
FIG. 14 is block diagram of a table entry in the virtual-to-physical table, in accordance with an embodiment of the present invention.

FIG. 14 illustrates a table entry 1400 in the VP table 1330 (FIG. 13), in accordance with an embodiment of the present invention. The table entry 1400 includes a portion 1405, a portion 1410, and a portion 1415. The portion 1405 stores a status indicator for a physical unit to which a virtual unit is mapped. The portion 1410 stores a free sector pointer indicating a number of physical sectors available (i.e., free) in the physical unit. The portion 1415 stores a physical unit number of the physical unit. For example, the portion 1415 can store a memory block number, the portion 1410 can store a number of available memory pages in the memory block, and the portion 1405 can store a value of zero indicating that the memory block is invalid or a value of one indicating that the memory block is valid.

In the embodiment of FIG. 14, the table entry 1400 includes sixteen bits. The portion 1415 includes nine lower bits (i.e., bits 0-8), the portion 1410 includes seven middle bits (i.e., bits 9-15), and the portion 1405 includes the highest bit (i.e., bit 16) of the table entry 1400. In other embodiments, the table entry 1400 can have more or fewer than sixteen bits, the portion 1405 can have more or fewer than one bit, the portion 1410 can have more or fewer than seven bits, and the portion 1415 can have more or fewer than nine bits.

Referring again to FIG. 13, the VP table 1330 maps a virtual unit (e.g., virtual unit 1312, 1314, 1316, 1318, 1320, or 1322) in the virtual portion 1310 to a physical unit (e.g., physical unit 1352, 1354, 1356, or 1360) in the physical portion 1350. In the exemplary VP table 1330, the table entries (e.g., table entries 1332, 1334, 1336, 1338, 1340, or 1342) include eights bits. The four least significant bits (LSB) indicate a physical unit in the physical portion 1350. The next three bits higher order bits indicate a number of available physical sectors (i.e., a free sector pointer) in the physical unit 1350. The most significant bit (MSB) stores a status indicator for a physical unit in the physical portion 1350. A value of one in the MSB indicates that the physical unit is valid and a value of zero indicates that the physical unit is invalid.

In the following example, values in table entries of the VP table 1330 are indicated in hexadecimal notation. The table entry 1334 contains a value B0h indicating that the corresponding virtual unit 1314 is mapped to the physical unit 1352 having the physical unit number zero (PU#0). The value B0h in the table entry 1334 indicates that the physical unit 1352 is valid and three physical sectors are being used in the physical unit 1352. The table entry 1336 contains a value 92h indicating that the corresponding virtual unit 1316 is mapped to the physical unit 1356 having the physical unit number two (PU#2). The value 92h in the table entry 1336 also indicates that the physical unit 1356 is valid and that one physical sector is being used in the physical unit 1356. The table entry 1338 contains a value B4h indicating that the corresponding virtual unit 1318 is mapped to the physical unit 1360 having the physical unit number four (PU#4). The value B4h in the table entry 1338 indicates that the physical unit 1360 is valid and that three physical sectors are being used in the physical unit 1360.

The table entry 1340 contains a value 21h indicating that the corresponding virtual unit 1320 is mapped to the physical unit 1354 having the physical unit number one (PU#1). The value 21h in the table entry 1340 also indicates that the physical unit 1354 is invalid and that two physical sectors are being used in the physical unit 1354. The table entry 1332 contains a value FFh indicating that the table entry 1332 is not currently mapping the corresponding virtual unit 1312 in the virtual portion 1310 to a physical unit in the physical portion 1350.

In one embodiment, if the value of a table entry in the VP table 1330 indicates that the free sector pointer 1410 (FIG. 14) is not zero, logical sectors are mapped to corresponding virtual sectors of the virtual unit in the virtual portion 1310 corresponding to that table entry as shown in FIG. 3 or 4. If the value of the table entry in the VP table 1330 indicates that the free sector pointer 1410 is zero, logical sectors are mapped to virtual sectors of the virtual unit in the virtual portion as described below with reference to FIG. 15.

For example, in the embodiment of FIG. 13, the table entry 1342 contains a value 85h indicating that the corresponding virtual unit 1322 is mapped to the physical unit 1362 having the physical unit number five (PU#5). The value 85h in the table entry 1342 also indicates that the free sector pointer is zero for the mapping of the virtual unit 1322 to the physical unit 1362. Thus, logical sectors are mapped to virtual sectors in the virtual unit 1322 as described below with reference to FIG. 15.

Figure 15:
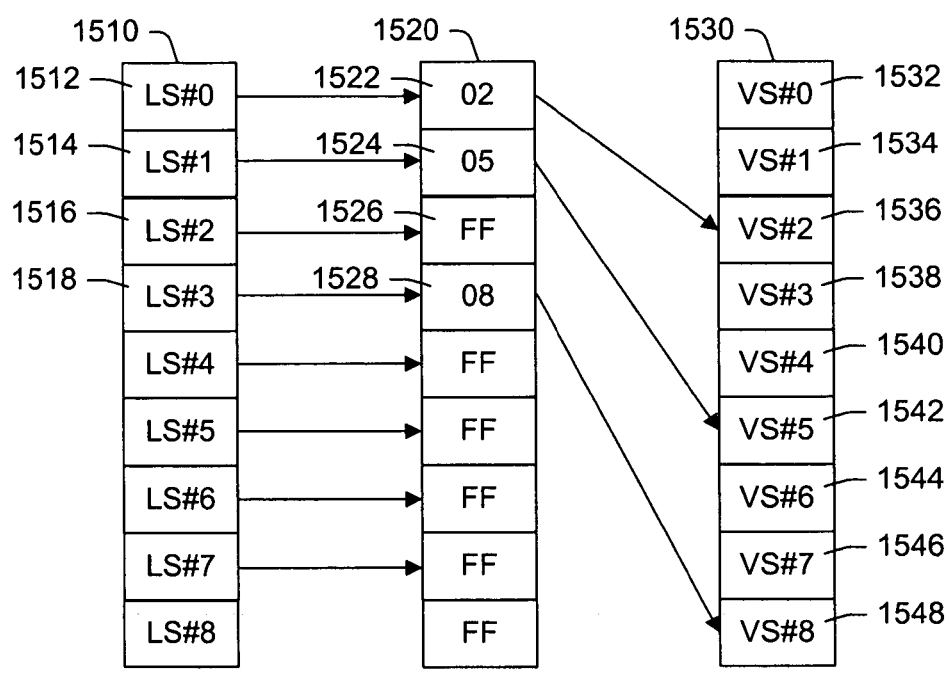
FIG. 15 is a block diagram of a logical-to-virtual table, in accordance with an embodiment of the present invention.

FIG. 15 illustrates a logical-to-virtual (LV) table 1520, in accordance with one embodiment of the present invention. The LV table 1520 maps a logical unit 1510 to a virtual unit 1530. The logical unit 1510 includes logical sectors, such as logical sectors 1512, 1514, 1516, and 1518. The virtual unit 1530 includes virtual sectors, such as virtual sectors 1532, 1534, 1536, 1538, 1540, 1542, 1544, 1546, and 1548. The LV table 1520 includes table entries (e.g., table entry 1522, 1524, 1526, and 1528) corresponding to the logical sectors in the logical unit 1510. Each table entry in the LV table 1520 maps the corresponding logical sector of the logical unit 1510 to a virtual sector in the virtual unit 1530. In various embodiments, the LV table 1520 is a data structure such as, for example, a data structure defined in a high-level computing language.

In the exemplary LV table 1520 of FIG. 15, the table entry 1522 contains a value 02h indicating that the corresponding logical sector 1512 having a logical sector number zero (LS#0) is mapped to the virtual sector 1536 having the virtual sector number two (VS#2). The table entry 1524 contains a value 05h indicating that the corresponding logical sector 1514 having a logical sector number one (LS#1) is mapped to the virtual sector 1542 having the virtual sector number five (VS#5). The table entry 1528 contains a value 08h indicating that the corresponding logical sector 1518 having a logical sector number three (LS#3) is mapped to the virtual sector 1548 having the virtual sector number eight (VS#8). Some of the table entries (e.g., table entry 1526) in the LV table 1520 may contain a value FFh indicating that the corresponding logical sector (e.g., logical sector 1516) is not mapped to a virtual sector in the virtual unit 1530.

The management module 140 (FIG. 1) maps the logical sectors (e.g., logical sectors 1512, 1514, 1516, and 1518) in the logical unit 1510 to the virtual sectors (e.g., virtual sectors 1536, 1542, and 1548) in the virtual unit 1530 in the order the management module 140 receives the logical sectors. In the exemplary embodiment of FIG. 15, the management module 140 receives data units and stores the logical addresses of the data units into the logical sectors 1512, 1514, and 1518. As the logical sector 1512, 1514, or 1518 is modified, the logical sector is mapped to the next available virtual sector in the virtual unit 1530 (i.e., the next unused virtual sector having the lowest virtual sector number). Thus, although the logical sectors 1512, 1514, and 1518 are currently mapped to the virtual sectors 1536, 1542, and 1548, one or more of the logical sectors 1512, 1514, or 1518 have been previously mapped to one or more of the virtual sectors 1532, 1534, 1538, 1540, 1544, and 1546. In this way, the virtual sectors in the virtual unit 1530 are used sequentially from the lowest virtual sector number (VS#0) to the highest virtual sector number (VS#8). For example, the logical sector 1518 may be successively mapped to the virtual sectors 1534, 1538, and 1540 before being mapped to the virtual sector 1548.

Although nine logical sectors, table entries, and virtual sectors are shown in the embodiment of FIG. 15, other embodiments may include more or fewer logical sectors in the logical unit 1510, more or fewer table entries in the LV table 1520, or more or fewer virtual sectors in the virtual unit 1530. In various embodiments, the VP table 1330 (FIG. 13) in combination with the LV table 1520 allows the management module 140 (FIG. 1) to access data in the memory device 170 (FIG. 1) in an improved manner, which tends to minimize data movement, extend the lifetime of the memory device 170, and improve the operational efficiency of write operations.

In embodiments of the present invention, the management module 140 (FIG. 1) receives logical sectors from the host interface 120 (FIG. 1), maps the logical sectors to physical sectors, and accesses the logical sectors in the memory device 170 (FIG. 1) based on physical sector numbers of the physical sectors. The data access method, as described more fully herein, improves the operational efficiency of the memory device 170 and increases the reliability of data access operations in the memory device 170. The data access method includes both sector management and block management processes. A benefit of various embodiments of the invention include the reduction in the number of memory block erasures and interleaving memory accesses (to overlap memory operations with busy times), which improves the operational efficiency of the memory device 170. Another benefit of the various embodiments of the invention is a reduction in the burst write time of the electronic device 100.

In one embodiment, the management module 140 (FIG. 1) allows the host 110 (FIG. 1) to sequentially access data (e.g., data units) in the memory device 170 (FIG. 1) by using the LBA mode of the ATA protocol. Moreover, the management module 140 allows the memory device 170 to reduce the number of block erasures and block writes, which tends to increase the operating life of the memory device 170.

In various embodiments of the data access method, logical sectors are basic units of data. Thus, the data is organized into logical sector units. When data (e.g., a data unit) is written into a memory block of the memory device, the original logical sector information is preserved. The data is written into the same memory block of the memory device according to the sequence it is received instead of the sequence of the logical sectors. Therefore, a block erasure and a block write (i.e., a block refresh) need not be performed until the memory block is full.

The data access method may be applied to a high capacity or mass storage flash memory device. For example, a Gigabit-sized flash memory such as model TH58100OFT provided by Toshiba Japan, Inc. requires that all memory pages within the same memory block be programmed from the least significant bit (LSB) page to the most significant bit (MSB) page. Thus, the memory pages in this flash memory device may not be accessed with a random page access method.

A description of embodiments of a method for accessing data in the memory device 170 (FIG. 1), in accordance with the present invention, follows below with reference to FIGS. 16-19. The management module 140 (FIG. 1) receives records (i.e., data records), each of which includes one or more logical sectors of data. For example, the logical sectors may be memory pages. The management module 140 maps the logical sectors to one or more physical units of the memory device 170, and provides the logical sectors along with one or more physical unit numbers to the memory interface 160 (FIG. 1). In turn, the memory interface 160 facilitates the writing of the logical sectors into physical units of the memory device 170 at the physical addresses. Although embodiments of the data access method described below with reference to FIGS. 16-19 discuss logical sectors mapped into memory blocks of the memory device 170, other embodiments may map logical sectors other than memory pages into physical units other than memory blocks.

Figure 16:
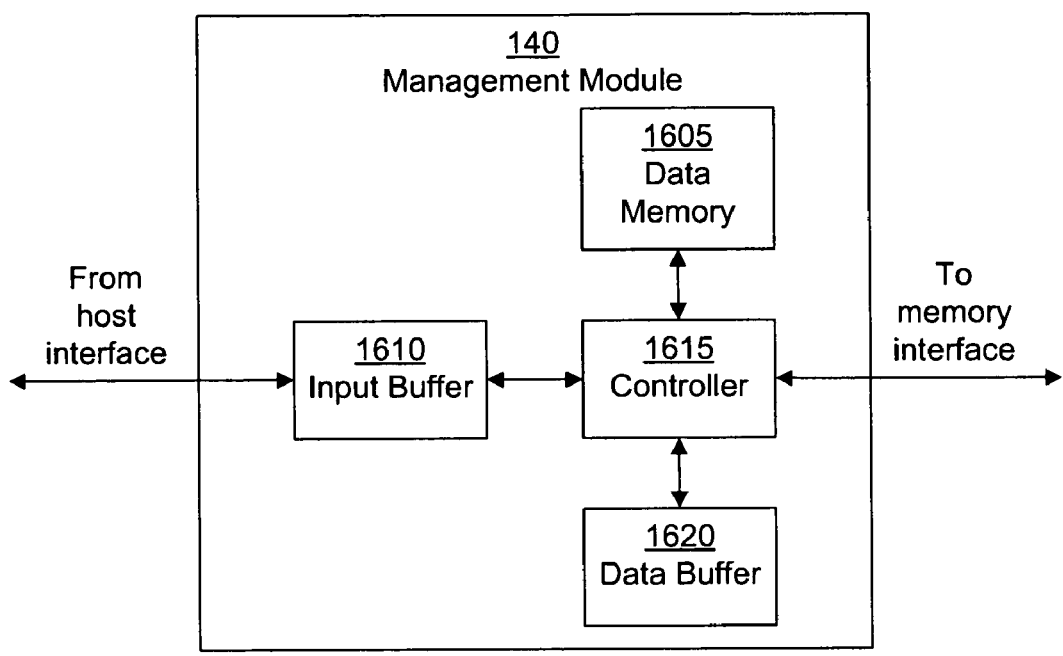
FIG. 16 is a block diagram of a management module, in accordance with an embodiment of the present invention.

FIG. 16 illustrates a management module 140, in accordance with one embodiment. The management module 140 includes a data memory 1605, an input buffer 1610, a controller 1615, and a data buffer 1620. The input buffer 1610 is coupled to the host interface 120 (FIG. 1) and the controller 1615. The controller 1615 is coupled to the data memory 1605, the input buffer 1610, the data buffer 1620 and the memory interface 160 (FIG. 1).

The data memory 1605 stores the VP table 1330 (FIG. 13) and the LV table 1520 (FIG. 15). The input buffer 1610 receives data in logical sector units (i.e., data units) from the host interface 120 (FIG. 1) and stores the data. For example, the data units may be memory pages or data records, and the input buffer 1610 may be a data queue. The controller 1615 manages the data units received in the input buffer 1610. For example, the controller 1615 can update or access the VP table 1330 and the LV table 1520 in the data memory 1605, and can store data units into the data buffer 1620. Additionally, the controller 1615 communicates with the memory interface 160 (FIG. 1) to access data units in the memory device 170 (FIG. 1). For example, the controller 1615 can write data units stored in the data buffer 1620 into the memory device 170 via the memory interface 160.

In one embodiment, the input buffer 1610 receives data units referenced by logical addresses (i.e., logical sector numbers). The controller 1615 maps the logical addresses to virtual addresses of a virtual unit and stores the data units into the data buffer 1620. Thus, the data buffer 1620 may represent a virtual unit in the management module 140. The controller 1615 can then write the data units in the data buffer 1620 into physical sectors (e.g., memory blocks) of a physical unit in the memory device 170 (FIG. 1). In this way, the management module 140 can access data units in physical sectors of the memory device 170. Moreover, the size of a data unit may differ from the size of a physical unit in the memory device 170. For example, the data unit may be a memory page or a data record, and the physical unit may be a memory block.

Figure 17:
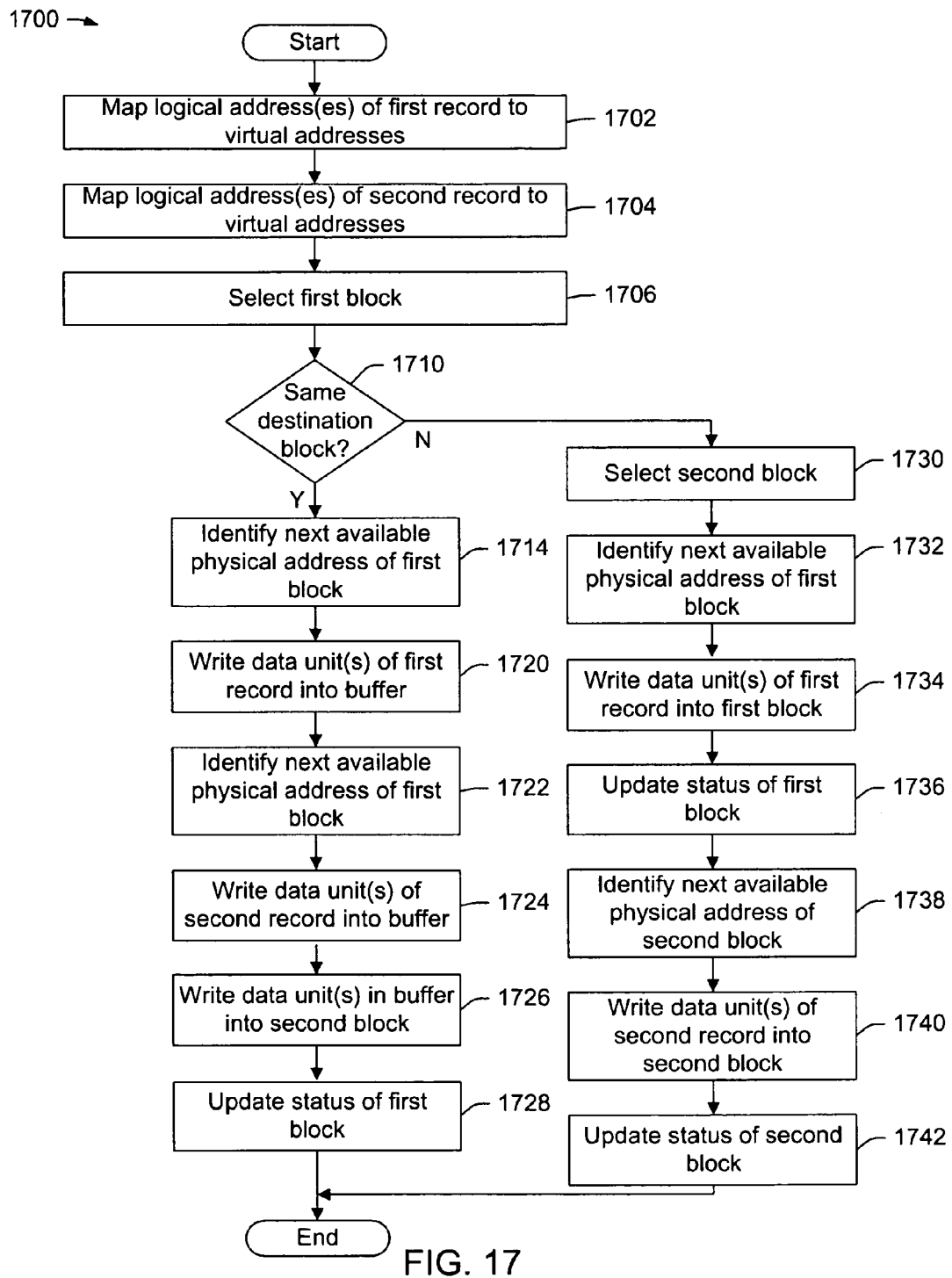
FIG. 17 is a flow chart of a data access method, in accordance with an embodiment of the present invention.

FIG. 17 is a flow chart of a data access method 1700, in accordance with an embodiment of the present invention. In this embodiment, the logical sectors (e.g., memory pages) of a first record and a second record are to be stored into physical units (e.g., a memory blocks) in the memory device 170 (FIG. 1). Moreover, the first record and the second record can each be written to the same physical unit in one write operation.

In step 1702, the logical sectors of the first record are mapped to virtual sectors of a virtual unit. In one embodiment, the controller 1615 (FIG. 16) maps the logical sectors (e.g., logical sectors 1512, 1514, 1516, or 1518) of the first record to the virtual sectors (e.g., virtual sectors 1536, 1542, or 1548) by storing one or more values in the LV table 1520 (FIG. 15).

In step 1704, the logical sectors of the second record are mapped to virtual sectors of a virtual unit. The virtual unit containing the second record may be the same virtual unit containing the first record, or the virtual unit containing the second record may be a different virtual unit than the virtual unit containing the first record. In one embodiment, the controller 1615 (FIG. 16) maps the logical sectors (e.g., logical sectors 1512, 1514, 1516, or 1518) of the second record to the virtual sectors (e.g., virtual sectors 1536, 1542, or 1548) by storing one or more values in the LV table 1520 (FIG. 15).

In step 1706, a first block is selected. The first block may be an unused memory block in the memory device 170 (FIG. 1), or the first block may be a memory block in the memory device 170 having data units stored in some of the physical sectors of the memory block. The first block may be selected by mapping a virtual unit containing the first record to a physical unit (e.g., a memory block) in the physical portion 1350 (FIG. 13). In one embodiment, the controller 1615 selects the first block by mapping the virtual unit (e.g., virtual unit 1314, 1316, 1318, or 1320) containing the first record to a physical unit (e.g., physical unit 1352, 1354, 1356, or 1360) based on the VP table 1330 (FIG. 13).

In step 1710, it is determined whether the second record has the same destination block as the first record. The second record has the same destination block as the first record if the logical sectors of the first record are mapped to the same virtual unit as the logical sectors of the second record. In one embodiment, the controller 1615 (FIG. 16) determines whether the second record has the same destination block as the first record based on the LV table 1520 (FIG. 15). If the second record has the same destination block as the first record, the method proceeds to step 1714, otherwise the method proceeds to step 1730.

In step 1714, arrived at from the determination in step 1710 that the second record has the same destination block as the first record, a next available physical sector in the first block is identified. The next available physical sector may be an unused physical sector having the lowest physical sector number in the physical unit. Thus, the next available physical sector in an unused physical unit may have a physical sector number zero (PS#0). In one embodiment, the controller 1615 (FIG. 16) determines the next available physical sector in the first block based on the free sector pointer of the first block in the VP table 1330 (FIG. 13).

In step 1720, the data unit(s) in the first record are written into a data buffer. In one embodiment, the controller 1615 (FIG. 16) writes the data unit(s) of the first record into the data buffer 1620 (FIG. 16) based on the virtual address(es) of the data unit(s) in the first record.

In step 1722, a next available physical sector in the first block is identified. In one embodiment, the controller 1615 (FIG. 16) determines the next available physical sector in the first block based on the VP table 1330 (FIG. 13).

In step 1724, the data unit(s) of the second record are written to the data buffer. In one embodiment, the controller 1615 (FIG. 16) writes the data unit(s) of the second record into the data buffer 1620 (FIG. 16) based on the virtual address(es) of the data unit(s) in the second record. The controller 1615 may write the data unit(s) of the second record at the next available memory address of the data buffer 1620. In this way, the data units of the first record and the second record are written into sequential memory addresses of the data buffer 1620 based on sequential virtual addresses.

In step 1726, the data unit(s) in the data buffer are written into the first block. In this way, the data units of both the first record and the second record are written into the first block in one write operation. In one embodiment, the controller 1615 (FIG. 16) communicates with the memory device 170 (FIG. 1) via the memory interface 160 (FIG. 1) to store the data unit(s) in the data buffer 1620 into the first block of the memory device 170 (FIG. 1).

In step 1728, the status of the first block is updated to indicate a number of physical sectors available (i.e., free) in the first block. In one embodiment, the controller 1615 (FIG. 16) updates the free sector pointer in the VP table 1330 (FIG. 3) to indicate the number physical sectors available (i.e., free) in the first block.

In step 1730, arrived at from the determination in step 1710 that the second record does not have the same destination block as the first record, a second block is selected. The second block may be an unused memory block in the memory device 170 (FIG. 1), or the second block may be a memory block in the memory device 170 having logical sectors stored in some of the physical sectors of the memory block. The second block is selected by mapping the virtual unit containing the second record to a physical unit (e.g., a memory block) in the physical portion 1350 (FIG. 13). In one embodiment, the controller 1615 selects the second available block by mapping the virtual unit (e.g., virtual unit 1314, 1316, 1318, or 1320) to a physical unit (e.g., physical unit 1352, 1354, 1356, or 1360) based on the VP table 1330 (FIG. 13).

In step 1732, a next available physical sector in the first block is identified. In one embodiment, the controller 1615 (FIG. 16) determines the next available physical sector in the first block based on the VP table 1330 (FIG. 13).

In step 1734, the data unit(s) in the first record are written into the first block. In one embodiment, the controller 1615 (FIG. 16) communicates with the memory interface 160 (FIG. 1) to write the data unit(s) of the first record into the first block in the memory device 170 (FIG. 1).

In step 1736, the status of the first block is updated to indicate a number of physical sectors available (i.e., free) in the first block. In one embodiment, the controller 1615 (FIG. 16) updates the free sector pointer in the VP table 1330 (FIG. 3) to indicate the number physical sectors available (i.e., free) in the first block.

In step 1738, a next available physical sector in the second block is identified. In one embodiment, the controller 1615 (FIG. 16) determines the next available physical sector in the second block based on the VP table 1330 (FIG. 13).

In step 1740, the data unit(s) in the second record are written into the second block. In one embodiment, the controller 1615 (FIG. 1) communicates with the memory interface 160 (FIG. 1) to write the second record into the second block in the memory device 170 (FIG. 1).

In step 1742, the status of the second block is updated to indicate a number of physical sectors available (i.e., free) in the second block. In one embodiment, the controller 1615 (FIG. 1) updates the free sector pointer in the VP table 1330 (FIG. 3) to indicate the number of physical sectors available (i.e., free) in the second block. The method then ends.

The data access method illustrated in FIG. 17 allows the host 110 (FIG. 1) to access logical sectors in the memory device 170 (FIG. 1) having a different size than physical units in the memory device 170. For example, the host 110 can access memory pages in the memory device 170, which are stored in a memory block of the memory device 170. Moreover, the host 110 can update more than one record in a memory block by performing one write operation to a memory block in the memory block device 170. In this way, the number of block erasures is reduced and the operating efficiency of write operations is improved. Moreover, the operating life of the memory device 170 may be extended.

Figure 18:
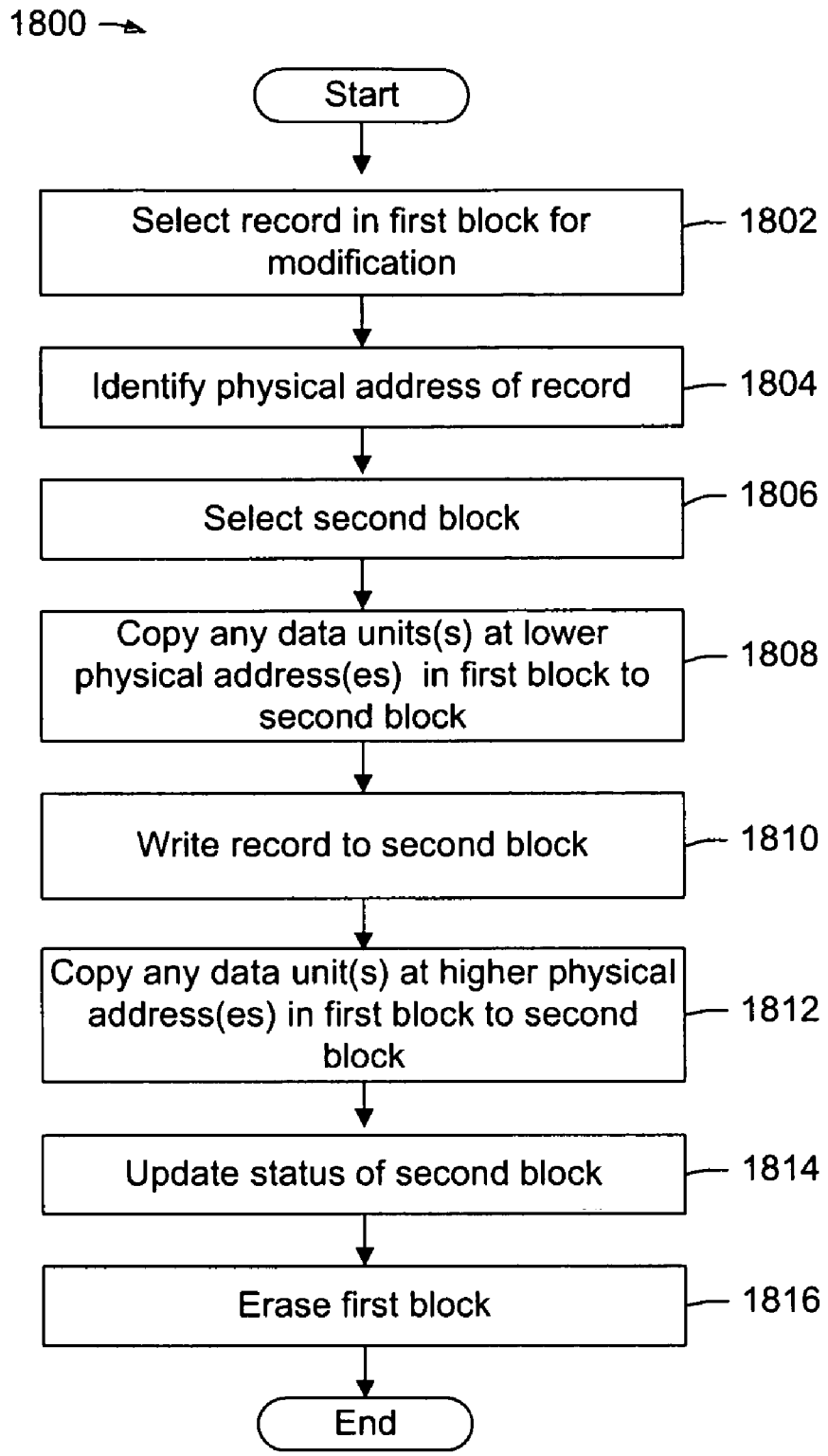
FIG. 18 is a flow chart of the data access method, in accordance with another embodiment of the present invention.

FIG. 18 illustrates a data access method 1800, in accordance with another embodiment of the present invention. In this illustration, a record in a first block is to be updated, but the first block does not have enough unused physical sectors for the logical sectors of the updated record.

In step 1802, a record in a first block is selected for modification. In one embodiment, the controller 1615 (FIG. 16) selects the record by identifying a write operation including a modified record having the same logical address of the record.

In step 1804, a physical address of the record in the first block is identified. In one embodiment, the controller 1615 (FIG. 16) identifies the physical address of the record in the first block based on the logical address of the record, the VP table 1330 (FIG. 3), and the LV table 1520 (FIG. 15).

In step 1806, a second block is selected. The second block may be an unused memory block in the memory device 170 (FIG. 1), or the second block may be a memory block in the memory device 170 having logical sectors stored in some of the physical sectors of the memory block. The second block may be selected by mapping a virtual unit containing the record to a physical unit (e.g., a memory block) in the physical portion 1350 (FIG. 13) in the physical portion 1350. In one embodiment, the controller 1615 (FIG. 16) selects the second block by mapping the virtual unit (e.g., virtual unit 1314, 1316, 1318, or 1320) containing the record to a physical unit (e.g., physical unit 1352, 1354, 1356, or 1360) based on the VP table 1330 (FIG. 13).

In step 1808, any data unit(s) in the first block stored in physical address(es) lower than the physical address of the record (i.e., physical addresses preceding the physical address of the record) are copied into the second block at the next available physical address of the second block. In one embodiment, the controller 1615 (FIG. 16) identifies the next available physical address in the memory block based on the VP table 1330 (FIG. 13). The controller 1615 then communicates with the memory interface 160 (FIG. 1) to copy the data unit(s) from the first block into the second block.

In step 1810, the record is written into the second memory block at the next available physical address. In one embodiment, the controller 1615 (FIG. 16) identifies the next available physical address based on the VP table 1330 and the number of data unit(s) copied from the first block into the second block, and writes the record into the second memory block at the next available physical address.

In step 1812, any data units(s) in the first block stored in physical address(es) higher than the physical address of the record (i.e., physical addresses succeeding the physical address of the record) are copied into the second block at the next available physical address of the second block. In one embodiment, the controller 1615 (FIG. 16) identifies the next available block based on the VP table 1330 (FIG. 13) and the number of data unit(s) in the record written into the second block. The controller 1615 then communicates with the memory interface 160 (FIG. 1) to copy the logical sector(s) from the first block into the second block.

In step 1814, the status of the second block is updated to indicate the number of physical sectors available in the second block. In one embodiment, the free sector pointer of the second block is updated to indicate the number of physical sectors available in the second block. In one embodiment, the controller 1615 (FIG. 16) updates the status of the second block by updating the VP table 1330 (FIG. 13) in the data memory 1605 (FIG. 16).

In step 1816, the first block is erased. Also in step 1816, the free sector pointer of the first block is updated to indicate the number of physical address available (i.e., free) in the first block. In one embodiment, the controller 1615 (FIG. 16) issues an erase command to the memory device 170 (FIG. 1) via the memory interface 160 (FIG. 1) to erase the first block.

In step 1816, the status of the second block is updated to indicate the number of physical sectors available (i.e., free) in the second block. In one embodiment, the controller 1615 (FIG. 16) updates the status of the second block by updating the free sector pointer of the second block in the VP table 1330 (FIG. 13). The method then ends.

Figure 19:
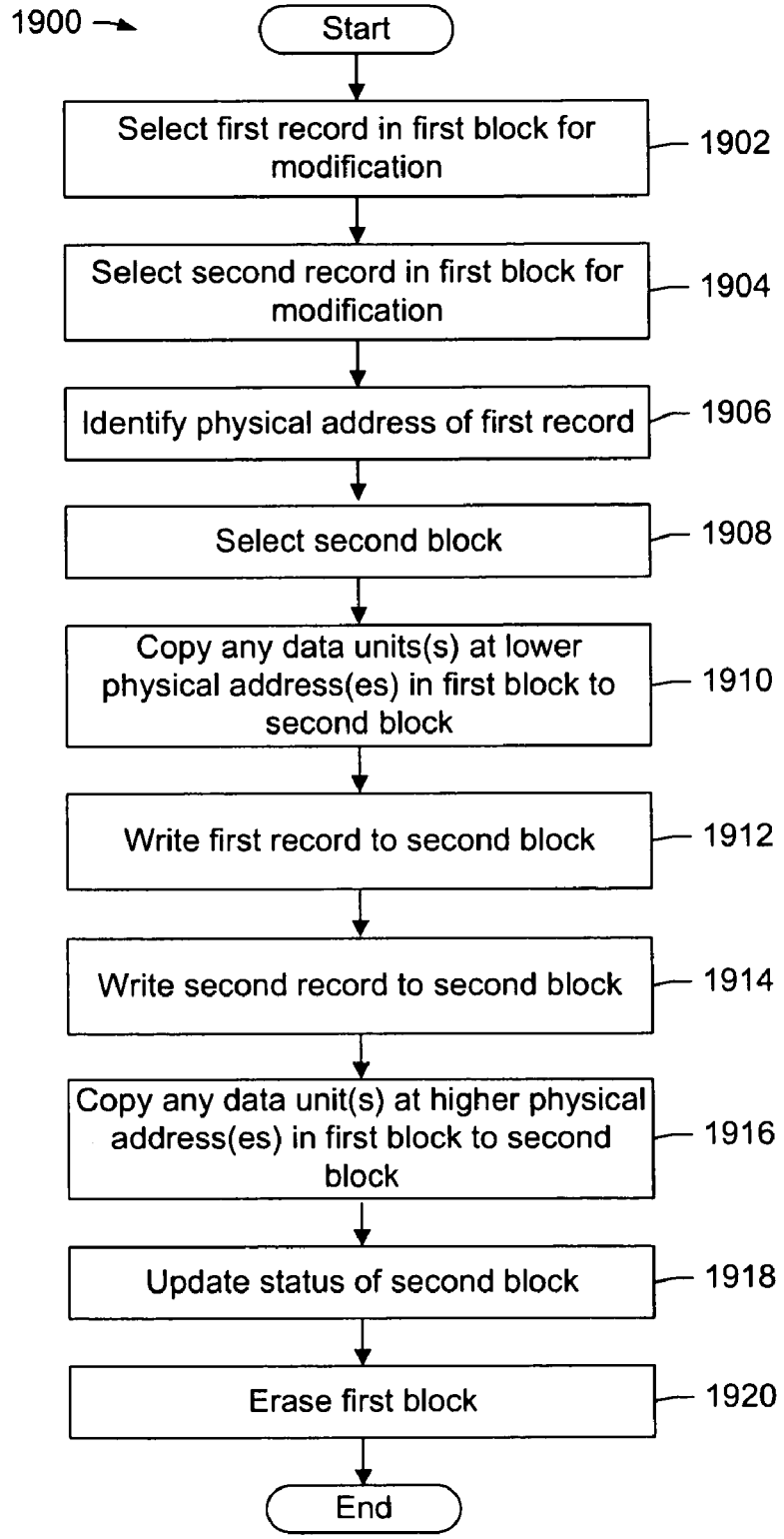
FIG. 19 is a flow chart of the data access method, in accordance with another embodiment of the present invention.

FIG. 19 illustrates a data access method 1900, in accordance with another embodiment of the present invention. In this illustration, a first record and a second record in a first block are to be updated, but the first block does not have enough unused physical sectors for the logical sectors of the updated records. Also, the physical sector number of the first record in the first block is lower than the physical sector number of the second record in the first block (i.e., the physical sector number of the first record precedes the physical sector number of the second record).

In step 1902, a first record in a first memory block is selected for modification. In one embodiment, the controller 1615 (FIG. 16) selects the first record by identifying a write operation including a modified first record having the same logical address of the first record.

In step 1904, a second record in a first memory block is selected for modification. In one embodiment, the controller 1615 (FIG. 16) selects the second record by identifying a write operation including a modified second record having the same logical address of the second record.

In step 1906, a physical address of the first record in the first memory block is identified. In one embodiment, the controller 1615 (FIG. 16) identifies the physical address of the first record in the first memory block based on the logical address of the record, the VP table 1330 (FIG. 3), and the LV table 1520 (FIG. 15).

In step 1908, a second block is selected. The second block may be an unused memory block in the memory device 170 (FIG. 1), or the second block may be a memory block in the memory device 170 having logical sectors stored in some of the physical sectors of the memory block. The second block may be selected by mapping a virtual unit containing the first record to a physical unit (e.g., a memory block) in the physical portion 1350 (FIG. 13) in the physical portion 1350. In one embodiment, the controller 1615 (FIG. 16) selects the second block by mapping the virtual unit (e.g., virtual unit 1314, 1316, 1318, or 1320) containing the first record to a physical unit (e.g., physical unit 1352, 1354, 1356, or 1360) based on the VP table 1330 (FIG. 13).

In step 1910, any data units(s) in the first block stored in physical address(es) lower than the physical address of the first record (i.e., physical addresses preceding the physical address of the record) are copied into the second block at the next available physical address of the second block. In one embodiment, the controller 1615 (FIG. 16) identifies the next available physical address in the memory block based on the VP table 1330 (FIG. 13). The controller 1615 then communicates with the memory interface 160 (FIG. 1) to copy the logical sector(s) from the first block into the second block.

In step 1912, the first record is written into the second memory block at the next available physical address. In one embodiment, the controller 1615 (FIG. 16) identifies the next available physical address based on the VP table 1330 (FIG. 13) and a number of data unit(s) copied from the first block into the second block, and writes the data unit(s) of the first record into the second memory block at the next available physical address.

In step 1914, the second record is written into the second memory block at the next available physical address. In one embodiment, the controller 1615 (FIG. 16) identifies the next available physical address based on the VP table 1330 (FIG. 13) and a number of data unit(s) written from the first record into the second block, and writes the first record into the second memory block at the next available physical address.

In step 1916, any data units(s) in the first block stored in physical address(es) higher than the physical address of the second record (i.e., physical addresses succeeding the physical address of the second record) are copied into the second block at the next available physical address of the second block. In one embodiment, the controller 1615 (FIG. 16) identifies the next available block based on the VP table 1330 (FIG. 13) and a number of data unit(s) in the second record written into the second block, and communicates with the memory interface 160 (FIG. 1) to copy the data unit(s) from the first block into the second block.

In step 1918, the status of the second block is updated to indicate the number of physical sectors available in the second block. In one embodiment, the free sector pointer of the second block is updated to indicate the number of physical sectors available in the second block. In one embodiment, the controller 1615 (FIG. 16) updates the status of the second block by updating the free sector pointer of the second block in the VP table 1330 (FIG. 13).

In step 1920, the first block is erased. Also in step 1920, the free sector pointer of the first block is updated to indicate the number of physical address available (i.e., free) in the first block. In one embodiment, the controller 1615 (FIG. 16) issues an erase command to the memory device 170 (FIG. 1) via the memory interface 160 (FIG. 1) to erase the first block.

Although the invention has been described with reference to particular embodiments thereof, it will be apparent to one of the ordinary skill in the art that modifications to the described embodiment may be made without departing from the spirit of the invention. Accordingly, the scope of the invention will be defined by the attached claims not by the above detailed description.

What is claimed is:

1. A system for accessing data in a memory device comprising a plurality of memory units, the system comprising:
    a first interface configured to receive a plurality of data units and a corresponding plurality of non-sequential logical addresses; and
    a management module coupled to the first interface and configured to map the plurality of non-sequential logical addresses to a plurality of sequential virtual addresses according to the order in which the data units in the plurality of data units are received by the first interface, the management module further configured to map the plurality of sequential virtual addresses to a corresponding plurality of physical addresses; and
    a second interface coupled to the management module and configured to write the plurality of data units to the plurality of physical addresses in one write operation.

2. The system of claim 1, wherein the management module comprises a first data structure containing the mapping of the plurality of non-sequential logical addresses to the plurality of sequential virtual addresses.

3. The system of claim 2, wherein the first data structure comprises a data table.

4. The system of claim 2, wherein the management module comprises a second data structure containing the mapping of a plurality of virtual units to a plurality of physical units, each of the virtual units in the plurality of virtual units comprising a plurality of virtual addresses, each of the physical units in the plurality of physical units comprising a plurality of physical addresses of a memory block in the memory device.

5. The system of claim 4, wherein the second data structure comprises a data table.

6. The system of claim 5, wherein the data table comprises a plurality of table entries, each table entry comprising a mapped physical unit status indicator, a pointer indicating a number of available physical sectors and a mapped physical unit number.

7. The system of claim 1, wherein each data unit in the plurality of data units is a sector of data.

8. The system of claim 1, wherein each data unit in the plurality of data units is a page of data.

9. The system of claim 1, wherein the management module is further configured to perform a block write operation to write the plurality of data units into the plurality of memory blocks at the plurality of physical addresses.

10. A system for accessing data in a memory device comprising a plurality of memory units, the system comprising:
    an input buffer configured to receive a plurality of data units and a corresponding plurality of non-sequential logical addresses; and
    a controller coupled to the input buffer and configured to map the plurality of non-sequential logical addresses to a plurality of sequential virtual addresses according to the order in which the data units in the plurality of data units are received in the input buffer, the controller further configured to map the plurality of sequential virtual addresses to a corresponding plurality of physical addresses and to issue a block write operation for writing the plurality of data units to the plurality of physical addresses.

11. The system of claim 10, further comprising a memory coupled to the controller and configured to store a first table for mapping the plurality of non-sequential logical addresses to the plurality of sequential virtual addresses, wherein the controller is further configured to map the non-sequential logical addresses to the plurality of sequential virtual address based on the first table.

12. The system of claim 11, wherein the memory is further configured to store a second table for mapping a plurality of virtual units to a plurality of physical units, each of the virtual units in the plurality of virtual units comprising a plurality of virtual addresses, each of the physical units in the plurality of physical units comprising a plurality of physical addresses of a memory block in the memory device, wherein the controller is further configured to map the plurality of virtual units to the plurality of physical units based on the second table.

13. The system of claim 12, wherein the second table comprises a data table comprising a plurality of table entries, each table entry comprising a mapped physical unit status indicator, a pointer indicating a number of available physical sectors and a mapped physical unit number.

14. The system of claim 10, wherein each data unit in the plurality of data units is a sector of data.

15. The system of claim 10, wherein each data unit in the plurality of data units is a page of data.

16. A method for accessing data in a memory device comprising a plurality of memory blocks, the method comprising:
    receiving a first plurality of data units and a corresponding first plurality of logical addresses;
    receiving a second plurality of data units and a corresponding second plurality of logical addresses, wherein the first and second pluralities of logical addresses are non-sequential;
    mapping the first plurality of logical addresses to a first plurality of sequential virtual addresses;
    mapping the second plurality of logical addresses to a second plurality of sequential virtual addresses;
    writing the first plurality of data units into a data buffer based on the first plurality of sequential virtual addresses;
    writing the second plurality of data units into the data buffer based on the second plurality of sequential virtual addresses, wherein the first and second plurality of data units are written into sequential memory addresses of the data buffer;
    mapping the first plurality of virtual addresses and the second plurality of virtual addresses to a plurality of physical addresses; and
    writing the first and second plurality of data units in the data buffer into the memory block at the plurality of physical addresses in one write operation.

17. The method of claim 16, wherein the first plurality of data units is a first record, and the second plurality of data units is a second record.

18. The method of claim 16, wherein each data unit in the first plurality of data units and each data unit in the second plurality of data units is a page of data.

* * * * *